(12) United States Patent
Shaw

(10) Patent No.: US 10,591,684 B2
(45) Date of Patent: Mar. 17, 2020

(54) OPTICAL COUPLING SYSTEM, CORRESPONDING DEVICE AND METHOD

(71) Applicant: STMicroelectronics S.r.l., Agrate Brianza (IT)

(72) Inventor: Mark Andrew Shaw, Milan (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 15/608,548

(22) Filed: May 30, 2017

(65) Prior Publication Data

US 2018/0113256 A1 Apr. 26, 2018

(30) Foreign Application Priority Data

Oct. 20, 2016 (IT) .................. 102016000105881

(51) Int. Cl.
*G02B 6/36* (2006.01)
*G02B 6/42* (2006.01)

(52) U.S. Cl.
CPC ......... *G02B 6/4204* (2013.01); *G02B 6/4249* (2013.01)

(58) Field of Classification Search
CPC .......... G02B 6/26; G02B 6/4204; G02B 6/42; G02B 6/12; G02B 2006/12166
See application file for complete search history.

(56) References Cited

U.S. PATENT DOCUMENTS

| | | | |
|---|---|---|---|
| 6,198,864 B1 * | 3/2001 | Lemoff | G02B 6/29367 385/24 |
| 6,318,909 B1 * | 11/2001 | Giboney | G02B 6/4201 257/700 |
| 6,927,109 B1 * | 8/2005 | Tanaka | B23K 26/0604 257/E21.134 |
| 7,251,398 B2 * | 7/2007 | Baets | G02B 6/4201 385/15 |
| 7,977,694 B2 * | 7/2011 | David | H01L 33/24 257/79 |

(Continued)

FOREIGN PATENT DOCUMENTS

EP 1 630 578 A2 3/2006

OTHER PUBLICATIONS

Italian Search Report, dated Jun. 22, 2017, for Italian Application No. 201600105881, 7 pages.

(Continued)

*Primary Examiner* — Ellen E Kim
(74) *Attorney, Agent, or Firm* — Seed IP Law Group LLP

(57) ABSTRACT

An optical coupling includes a body having a first surface which couples with a photonics integrated circuit and a second surface including an array of lenses integral with the body. The array of lenses couples to an optical fiber connector. The array of lenses may be a linear array. The body may be made of a polymer material, which may be optically cured. The photonics integrated circuit and the optical coupling may be used, for example, in a mobile phone. The optical coupling may be made by shaping curable material on a photonics integrated circuit into a body, and curing the body of curable material. The cured body includes the first surface in contact with the photonics integrated circuit and the second surface including the array of optical lenses to couple with the optical fiber connector.

32 Claims, 3 Drawing Sheets

(56) References Cited

U.S. PATENT DOCUMENTS

| | | | | |
|---|---|---|---|---|
| 8,540,437 B2 * | 9/2013 | Lee | G02B 6/4215 | 385/31 |
| 8,639,067 B2 * | 1/2014 | Matsuoka | G02B 6/12002 | 385/131 |
| 8,939,657 B2 * | 1/2015 | Hung | G02B 6/42 | 385/89 |
| 9,040,090 B2 * | 5/2015 | DeSimone | A61K 9/5138 | 424/501 |
| 9,063,304 B2 * | 6/2015 | Ohta | G02B 6/4214 | |
| 9,229,169 B2 * | 1/2016 | Doany | G02B 6/32 | |
| 9,429,725 B2 * | 8/2016 | Shao | H04B 10/40 | |
| 9,791,645 B2 * | 10/2017 | Meadowcroft | G02B 6/26 | |
| 9,882,355 B2 * | 1/2018 | Gerlach | H01S 5/423 | |
| 10,175,432 B2 * | 1/2019 | Tateyama | G02B 6/264 | |
| 2001/0021287 A1 * | 9/2001 | Jewell | G02B 6/4206 | 385/14 |
| 2002/0021874 A1 * | 2/2002 | Giboney | G02B 6/4201 | 385/90 |
| 2003/0085452 A1 * | 5/2003 | Brezina | G02B 6/4201 | 257/666 |
| 2004/0202477 A1 * | 10/2004 | Nagasaka | G02B 6/4214 | 398/138 |
| 2007/0183724 A1 * | 8/2007 | Sato | G02B 6/4249 | 385/89 |
| 2011/0216266 A1 * | 9/2011 | Travis | F21V 7/22 | 349/62 |
| 2011/0305415 A1 * | 12/2011 | Kawai | G02B 6/4292 | 385/14 |
| 2012/0280344 A1 * | 11/2012 | Shastri | G02B 6/426 | 257/432 |
| 2013/0045781 A1 * | 2/2013 | Tho | H04M 1/0283 | 455/575.1 |
| 2013/0127980 A1 * | 5/2013 | Haddick | G06F 3/013 | 348/14.08 |
| 2013/0156386 A1 * | 6/2013 | Miller | G02B 6/4284 | 385/93 |
| 2014/0181458 A1 * | 6/2014 | Loh | G06F 12/1027 | 711/206 |
| 2015/0063764 A1 | 3/2015 | Isenhour et al. | | |
| 2015/0212300 A1 * | 7/2015 | Kubo | G02B 1/041 | 359/754 |
| 2015/0247959 A1 * | 9/2015 | Sannokyou | C03B 11/08 | 359/619 |
| 2016/0116695 A1 * | 4/2016 | Nekado | G02B 6/421 | 385/14 |
| 2017/0098743 A1 * | 4/2017 | Chen | H01L 33/507 | |

OTHER PUBLICATIONS

Boeuf et al., "Silicon Photonics R&D and Manufacturing on 300-mm Wafer Platform," *Journal of Lightwave Technology* 34(2):286-295, 2016.

Chiaretti, "Towards the Industrial Deployment of the Silicon Photonics Technology," *Proc. of the IEEE Bipolar/BiCMOS Circuits and Technology Meeting*, 2013, pp. 135-142.

Dietrich et al., "Lenses for Low-Loss Chip-to-Fiber and Fiber-to-Fiber Coupling Fabricated by 3D Direct-Write Lithography," *Conference on Lasers and Electro-Optics (CLEO)*, 2016, 2 pages.

Houbertz et al., "High-precision 3D printing: fabrication of micro-optics and integrated optical packages," *Multiphoton Optics, Photonics West Exhibition*, 2016, 17 pages.

Hughes, "Passive Fiber Optic Interconnect Considerations for Silicon Photonics," *OIDA Workshop on Integrated Photonics High Volume Packaging*, 2016, 13 pages.

Narasimha et al., "An Ultra Low Power CMOS Photonics Technology Platform for H/S Optoelectronic Transceivers at less than $1 per Gbps," *Optical Fiber Communication Conference*, 2010, 3 pages.

\* cited by examiner

OPTICAL COUPLING SYSTEM, CORRESPONDING DEVICE AND METHOD

BACKGROUND

Technical Field

The description relates to optical coupling systems.

One or more embodiments may be applied, e.g., in silicon photonics arrangements including a single mode optical fiber coupling system for the input/output of light radiation.

Description of the Related Art

Documents such as, e.g., C. Chiaretti: "Towards the Industrial Deployment of the Silicon Photonics Technology" Proc. of the IEEE Bipolar/BiCMOS Circuits and Technology Meeting 2013 recognize an advantage of grating couplers which may lie in the light exiting from the wafer surface and not from the edge thus enabling, e.g., wafer level testing.

Coupling the light into a multiple fiber via a fiber V block attached to a silicon photonics chip has been proposed, e.g., by Narasimha et al.: "An Ultra Low Power CMOS Photonics Technology Platform for H/S Optoelectronic Transceivers at less than $1 per Gbps", OFC 2010. In such an arrangement, a laser in a silicon optical micro-package that includes a lens is directly mounted on a die. A single 8-channel fiber array serves as an optical interface to all four transmitter (TX) and receiver (RX) channels and is also attached to the die. The laser is wire-bonded to the die and electrically driven with a DC current and RF signals. This level of integration enables transceiver functionality with a small number of parts thus allowing such a transceiver to break the 1 Dollar per Gb/s barrier. This process requires active alignment of the fiber block to the silicon photonics, with fixing normally using UV epoxy, which may be a relatively slow process.

Certain existing optical fiber coupling systems for use with optical fiber communication transceivers may be suitable for use in modules which are fixed to the edge of a linecard. As operational speeds increase, a tendency may arise to reduce the distance (thus the electrical signal loss) between the optical transceiver and the associated electronic system (e.g., an ASIC). A need may thus arise of positioning the optical parts closer to the ASIC. Also, in such a configuration, the optical connector may exit from the optical transceiver horizontally, with the receptacle on the transceiver and the connector taking up valuable board space. It would therefore be advantageous to arrange the transceiver at a location where the connector plugs in from the top of the module. This arrangement leaves the area where the connector protrudes from the transceiver free for the line card to be populated with electrical components. It may also be used for modules where the ASIC and transceiver are co-packaged A silicon photonics single mode module may be a good substitute for a module with a fiber block and a length of fiber attached, thanks to a connector being simply attached to the top of the module.

An example of this type of approach is shown in M. Hughes: "Passive Fiber Optic Interconnect Considerations for Silicon Photonics", OIDA Workshop on Integrated Photonics High Volume Packaging, 20 Mar. 2016, Anaheim, Calif., USA. That document discloses a connector using a lens and a mirror system producing a collimated beam. The collimated beam is then coupled to the silicon photonics using a second lens system attached using a glue on top of the gratings. This is attached using a high accuracy pick-and-place machine, and the accuracy of placement influences the overall optical loss of the system.

More generally, collimated beam lens fabrication (e.g., via two-photon polymerization) is an intrinsically slow process, which may be difficult to implement due to height, e.g., in the case of a vertical lens.

Other documents of interest include:

P.-I. Dietrich et al.: "Lenses for Low-Loss Chip-to-Fiber and Fiber-to-Fiber Coupling Fabricated by 3D Direct-Write Lithography", 2016 Conference on Lasers and Electro-Optics (CLEO), 5-10 Jun. 2016, San Jose, Calif., USA;

F. Boeuf, et al.: "Silicon Photonics R&D and Manufacturing 300-mm Wafer Platform", IEEE Journal Of Lightwave Technology, Vol. 34, No. 2, Jan. 15, 2016, pp. 286-295;

R. Houbertz et al.: "High-precision 3D printing: fabrication of micro-optics and integrated optical packages", presented on Feb. 14, 2016 at Photonics West Exhibition, San Francisco, Calif., USA.

BRIEF SUMMARY

In an embodiment, an optical coupling system for coupling an optical fiber connector with a photonics integrated circuit includes a body attachable to said photonics integrated circuit and an array of lenses integrally formed with said body. In an embodiment, said array of lenses includes a linear array of lenses. In an embodiment, said body and said array of lenses include polymer material. In an embodiment, said body and said array of lenses include cured material, such as optically cured material. In an embodiment, a device includes the optical coupling system and a photonics integrated circuit providing at least one of electro-optical and opto-electrical signal conversion between an electrical side and an optical side of the circuit, wherein the optical coupling system is coupled with the optical side of said circuit. In an embodiment, said body is formed directly on said photonics integrated circuit. In an embodiment, said photonics integrated circuit includes input and/or output gratings at said optical side, with said optical coupling system coupled with the optical side of said circuit at said gratings. In an embodiment, the device includes an electrical circuit coupled, for example by pillars, with said electrical side of the photonics integrated circuit. In an embodiment, a method of manufacturing the optical coupling system comprises: dispensing curable material onto said photonics integrated circuit by shaping said curable material into said body and said array of lenses; and curing said material shaped into said body and said array of lenses thus providing said body and said array of lenses integrally formed therewith. In an embodiment, the method includes placing onto said curable material dispensed onto said photonics integrated circuit a stamp to shape said curable material into said body and said array of lenses. In an embodiment, the method includes removing excess curable material dispensed onto said photonics integrated circuit after placing said stamp.

In an embodiment, an optical coupling comprises: a body having: a first surface which, in operation, couples with a photonics integrated circuit; and a second surface including an array of lenses integral with the body, wherein the array of lenses, in operation, couples to an optical fiber connector. In an embodiment, said array of lenses includes a linear array of lenses. In an embodiment, said body comprises polymer material. In an embodiment, said body comprises cured material. In an embodiment, the cured material comprises optically cured material. In an embodiment, the array of lenses extend away from the second surface of the body.

In an embodiment, a device comprises: a photonics integrated circuit, which, in operation, converts one or more of: at least one electrical signal into an optical signal; and at least one optical signal into an electrical signal; and an optical coupling including a body having: a first surface optically coupled with the photonics integrated circuit; and a second surface including an array of lenses integral with the body, wherein the array of lenses, in operation, couples to an optical fiber connector. In an embodiment, said array of lenses includes a linear array of lenses. In an embodiment, said body comprises polymer material. In an embodiment, said body comprises cured material. In an embodiment, the cured material comprises optically cured material. In an embodiment, said body is positioned directly adjacent to said photonics integrated circuit. In an embodiment, said photonics integrated circuit includes optical gratings and said optical coupling couples with said optical gratings. In an embodiment, the device comprises an electrical circuit coupled with the photonics integrated circuit. In an embodiment, the device comprises pillars coupling the electrical circuit with the photonics integrated circuit. In an embodiment, the electrical circuit comprises image processing circuitry. In an embodiment, the device comprises mobile phone circuitry. In an embodiment, the array of lenses extend away from the second surface of the body.

In an embodiment, a method of manufacturing an optical coupling comprises: shaping curable material on a photonics integrated circuit into a body; and curing the body of curable material, the cured body including: a first surface in contact with the photonics integrated circuit; and a second surface including an array of optical lenses to couple with an optical cable. In an embodiment, the method comprises dispensing the curable material on to the photonics integrated circuit. In an embodiment, said array of lenses includes a linear array of lenses. In an embodiment, said curable material comprises a polymer. In an embodiment, the method comprises optically curing the curable material. In an embodiment, shaping the curable material into the body comprises stamping the curable material. In an embodiment, the method comprises removing excess curable material after the stamping. In an embodiment, said photonics integrated circuit includes optical gratings and said optical coupling couples with said optical gratings. In an embodiment, the array of optical lenses extend away from the second surface of the cured body.

In an embodiment, a system comprises: an integrated circuit having a first surface and a second surface, the first surface including a plurality of optical grating couplers; and an optical coupling body on the first surface of the integrated circuit, the optical coupling body including: a base portion having a first and second surface, the first surface of the base portion optically coupling with the plurality of optical grating couplers of the integrated circuit; and a plurality of optical lenses on the second surface of the base portion. In an embodiment, the plurality of optical lenses extend away from the second surface of the base portion. In an embodiment, the system comprises an optical fiber connector optically coupled to the plurality of optical lenses of the optical coupling body.

In one or more embodiments the lenses produced may be connected to each other to produce a single robust lens array block.

One or more embodiments may be based on the recognition that a collimated beam system may be preferable to a focusing lens system in some embodiments since, with the individual lens systems well aligned, the tolerance of alignment between a lensed connector and a lensed grating in the X, Y and Z directions may be relaxed (e.g., >10 micron–1 micron=$10^{-6}$ m) which may facilitate the use of a connector.

One or more embodiments may adopt a design and a process which may produce multiple lenses on gratings on a wafer rapidly for a commercially useful product.

One or more embodiments may adopt, e.g., wafer level fabrication processes as used, e.g., in manufacturing camera optics for mobile phone cameras.

One or more embodiments make it possible to provide lens arrays without adhesively applying ("gluing") the lenses, e.g., via a pick-and-place process.

In one or more embodiments a lens array may be directly formed on a grating with tolerances less than 200 nanometers ($200 \cdot 10^{-9}$ m).

BRIEF DESCRIPTION OF THE SEVERAL VIEWS OF THE DRAWINGS

One or more embodiments will now be described, by way of example only, with reference to the annexed figures, wherein.

It will be appreciated that for the sake of clarity and simplicity of illustration, the various figures may not be drawn to a same scale.

DETAILED DESCRIPTION

In the ensuing description, one or more specific details are illustrated, aimed at providing an in-depth understanding of examples of embodiments of the instant description. The embodiments may be obtained by one or more of the specific details or with other methods, components, materials, and so on. In other cases, known structures, materials or operations are not illustrated or described in detail so that certain aspects of embodiment will not be obscured.

Reference to "an embodiment" or "one embodiment" in the framework of the present description is intended to indicate a particular configuration, structure, characteristic described in relation to the embodiment is compliance in at least one embodiment. Hence, phrases such as "in an embodiment" or "in one (or more) embodiments" that may be present in one or more points in the present description do not necessarily refer to one and the same embodiment. Moreover, particular conformation, structures or characteristics as exemplified in connection with any of the figures may be combined in any other quite way in one or more embodiments as possibly exemplified in other figures.

The references used herein are provided merely for convenience and hence do not define the extent of protection or the scope of the embodiments.

Figure 1:
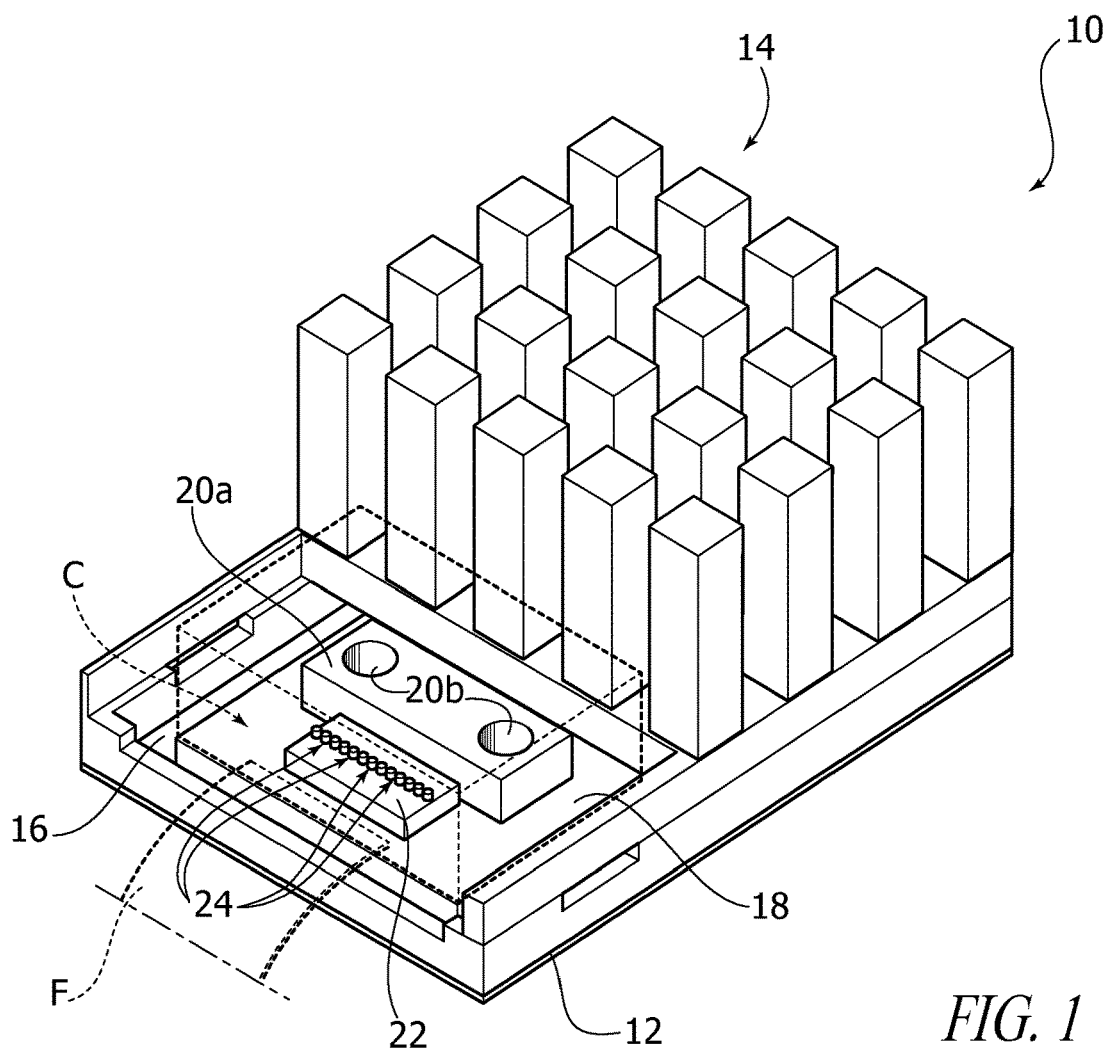
FIG. 1 is a schematic perspective view of an optoelectrical device including one or more embodiments.
Figure 2:
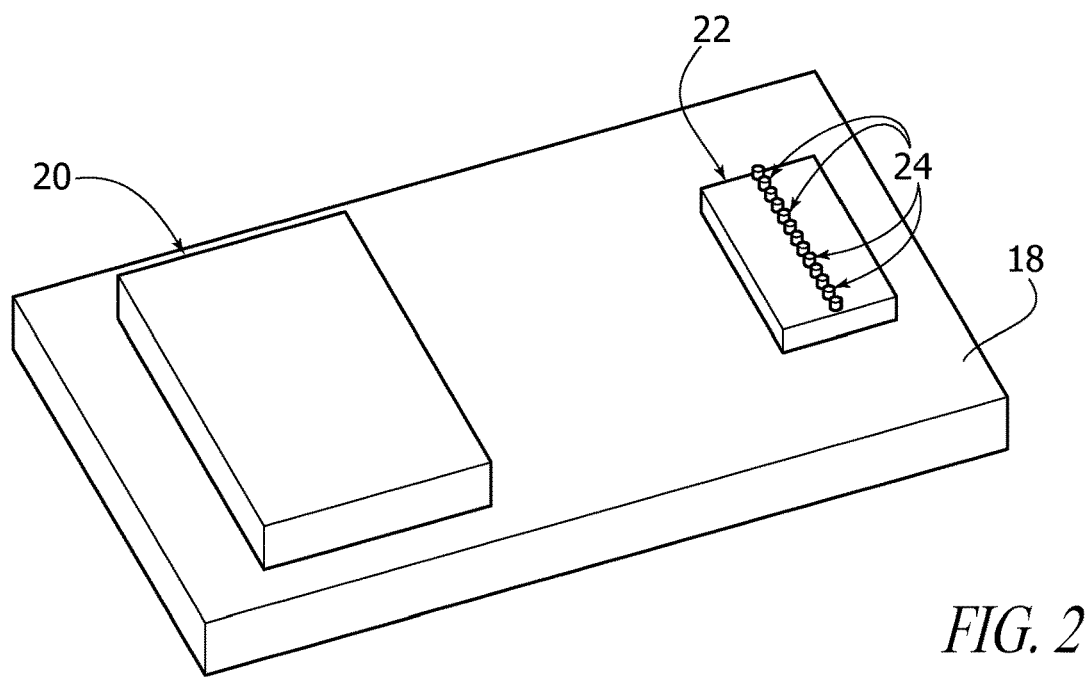
FIG. 2 is a more detailed view of a part of the device of FIG. 1.
Figure 3:
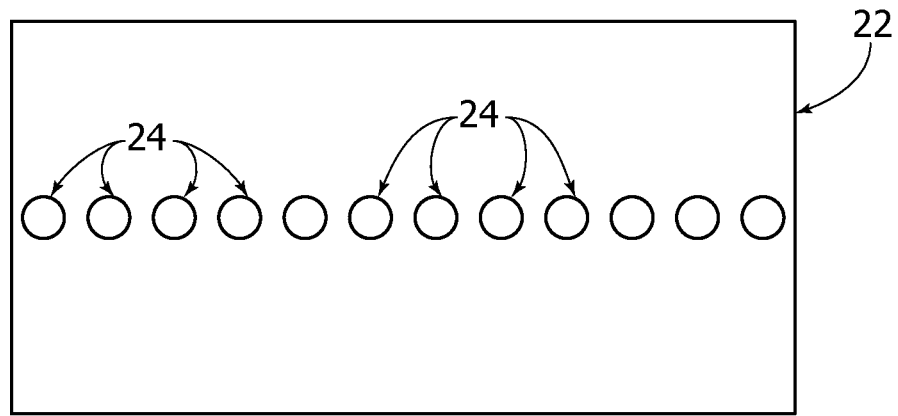
FIG. 3 is top view of an optical coupling system according to embodiments.
Figure 4:
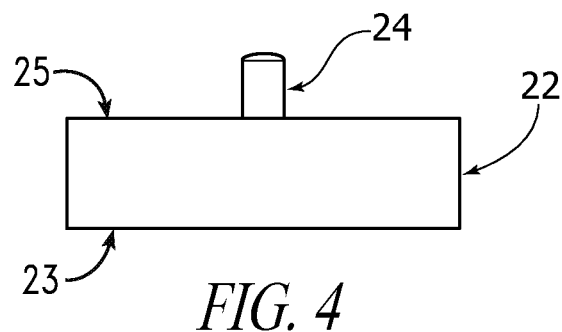
FIG. 4 is a side elevational view of an optical coupling system according to embodiments.
Figure 5:
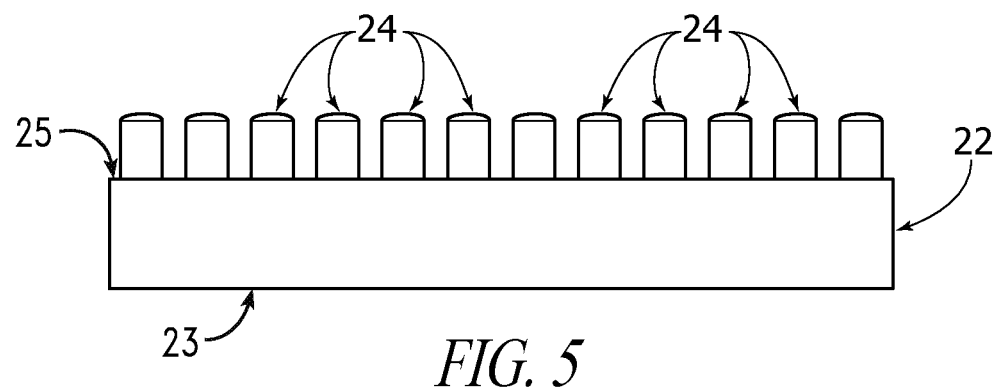
FIG. 5 is a further side elevational view of an optical coupling system according to embodiments.

FIG. 1 is a schematic perspective view of an optoelectrical device 10 to couple with an, e.g., ribbon-like array of optical fibers F.

In one or more embodiments coupling may occur via a connector C.

In one or more embodiments, the connector C may be of a type known per se. A connector as disclosed, e.g., in the paper by M. Hughes previously cited may be exemplary of a connector C compatible for use with the device 10 as exemplified herein, thus making it unnecessary to provide a more detailed description herein.

In one or more embodiments, the device 10 may include an, e.g., thermally conductive casing or package 12 of a channel-like structure having associated a heat sink 14.

In one or more embodiments, the device 10 may include a substrate (support member) 16, e.g., a printed circuit board (PCB) 16 sized and dimensioned to be arranged in the casing 12, e.g., fixed to the bottom wall of casing 12 which may include a channel shape.

In one or more embodiments, the support member 16 may host a (e.g., silicon) photonics integrated circuit (briefly, PIC) 18 providing (e.g., bi-directional) signal transmission between an electronic circuit 20, such as an electrical integrated circuit (EIC) and the array of optical fibers F via the connector C.

In one or more embodiments the EIC 20 and the PIC 18 may be separate and advantageously joined together, e.g., by Cu pillar technology. These two components being separate entities may facilitate using specific (e.g., optimal) manufacturing technologies for each of them.

In one or more embodiments these two components may be incorporated to a single electro-optical die, with optical and electrical functions on the same chip, e.g., with no separate EIC 20 as the EIC is merged in the OIC (PIC 18).

Also, in one or more embodiments as exemplified in FIG. 1, a (separate) connector interface 20a may be included to facilitate mechanical alignment, that is, to locate the connector C within a certain tolerance.

For instance, in one or more embodiments as exemplified in FIG. 1, the connector interface 20a may include one or more coupling formations such as, e.g., holes 20b for insertion of one or more complementary locating pins provided in the body of the connector C.

FIG. 1 refers—merely by way of example—to a connector C intended to be mounted on the device 10 with the ribbon-like array of fibers F extending away from the portion of the device where the heat sink 14 is located. One or more embodiments may permit mounting the connector C on the device 10 with the ribbon-like array of fibers F extending towards the portion of the device where the heat sink 14 is located, e.g., with the fibers F extending in a channel-like recess formed in the heat sink 14.

In one or more embodiments, the electronic circuit or EIC 20 may be part of an electro-optical transmitter-receiver (transceiver) configured for converting an electrical signal input to electrical side of the circuit 20 into an optical signal at the optical side of the PIC 18 circuit for transmission over the fibers F and, vice-versa, converting an optical signal received from the fibers F at the optical side of the PIC 18 into an electrical signal to be output from the electrical side of the circuit 20: such transmitter/receiver arrangements are otherwise known in the art (see, e.g., the documents cited in the introductory portion of the description), thus making it unnecessary to provide a more detailed description herein.

In one or more embodiments, the PIC 18 may include transmitter (TX) and receiver (RX) input/output gratings, and coupling with the fibers F may be via an optical coupling system 22, 24.

In one or more embodiments the coupling system 22, 24 may include a body 22 with an (e.g., linear) array of lenses 24 formed integrally (that is one-piece, optionally at the same time) with the body 22.

In an embodiment, the body 22 includes a first surface (e.g., a bottom surface) 23 which couples to the PIC 18, and a second surface (e.g., a top surface) 25, with the array of lenses 24 integrated into the second surface 25.

While a linear array (that is a single line of lenses 24 with, e.g., a fixed distance between each individual lens surface) is exemplified herein, in one or more embodiments, the array of lenses 24 may include different arrangements of lenses in a grid pattern corresponding (e.g., complementary) to a similar array of grating structures on the PIC 18. Such different arrangements of lenses in a grid pattern may include—by way of non-limiting example—more than one row (e.g., a rectangular array) and/or a circular array.

In one or more embodiments, the optical coupling system 22, 24 may be attached on the silicon photonics layer 18 without additional materials applied therebetween, e.g., by being formed directly thereon or by being assembled with locating formations.

In one or more embodiments, the lenses 24 may be joined together in an array (unlike lenses made, e.g., with two-photon polymerization), thus producing a single array lens structure.

In one or more embodiments, the optical coupling system (body 22, lenses 24) may be formed in single step by molding onto the PIC 18. This is in contrast with conventional arrangements as described, e.g., by Hughes (already cited) where the lens array is formed separately from the PIC and then glued onto the PIC with a suitable epoxy, e.g., by means of a high-accuracy pick-and-place assembly machine.

One or more embodiments may thus offer, e.g., the advantage that the lenses 24 can be formed at wafer level with a high level of accuracy and with a much faster process in comparison with pick-and-place attachment of separate lens arrays.

One or more embodiments may thus produce a collimated beam while having a small footprint.

In one or more embodiments, the lens array 24 can also be modified to produce a different diameter beam which, with a different lens design, would still produce a coupled beam.

In one or more embodiments the optical coupling system 22, 24 may be produced by using a polymer such as, e.g., SU8 photoresist that, once cured, may form the lenses 24 and the body 22 as a one-piece structure, e.g., with a refractive index of 1.35 on the PIC 18.

In one or more embodiments, this lens design may be optimized to produce a collimated beam of a diameter D (see FIG. 6) of, e.g., 80 micron (1 micron=$1 \cdot 10^{-6}$ m) that can interface with a collimated beam connector C capable of receiving having the same beam diameter.

In one or more embodiments, the beam diameter may diverge from the surface of the PIC 18 (grating).

In one or more embodiments the height of (the material of) the optical system 22, 24 may be such that the beam diverges sufficiently so that when the lens surface collimates the beam it has diverged sufficiently so that the beam diameter matches that of the connector that will be interfaced with the final module.

For instance, in one or more embodiments, the lens design may have a sufficient height for the beam emerging from the PIC die 18 (with a beam designed to match a collimated beam connector with an optical fiber having, e.g., a 8.6 micron core; 1 micron=$1 \cdot 10^{-6}$ m) to diverge and reach a $1/e^2$ value at a desired value for D, e.g., 80 micron as indicated above compatible with that of the optical connector. The lens surface then collimates the beam.

Again by way of non-limiting example, assuming a numerical aperture (NA—that is the range of angles over which the lens can accept or emit light) equal to 0.085 in air and a refractive index equal to 1.35 for the lens polymer, a height of the polymer stack of about 586 micron may permit to achieve a beam width of 80 micron (1 micron=$1 \cdot 10^{-6}$ m).

In certain documents such as Narasimha et al. (already cited) light is coupled into a chip by using a grating coupler (GC) that allows for nearly normal to surface coupling.

In fact, in an embodiment, for a maximum coupling the light exits the grating coupler with and angle (in air) of 11.6 degrees, when a fiber block is used and glued with epoxy at an angle of 8 degrees due to the different material refractive index (1.5).

Figure 6:
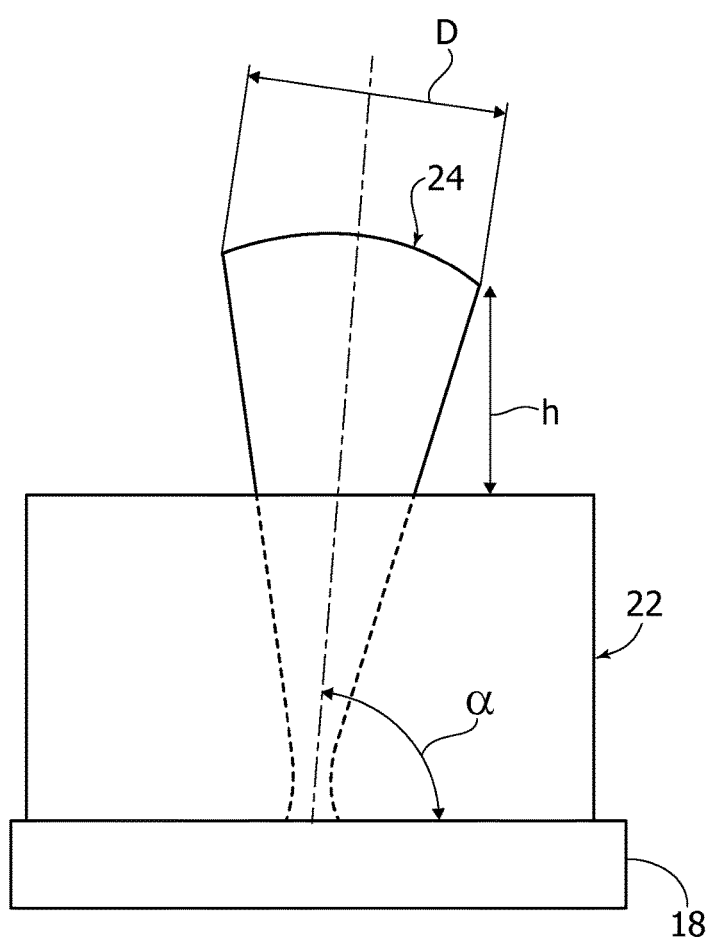
FIG. 6 is exemplary of possible optical characteristics of embodiments.

FIG. 6 is exemplary of one or more embodiments where the lenses 24 may be integrally formed with the body 22 in such a way to protrude over a certain "height" h from the body 22.

In one or more embodiments the lenses 24 may be integrally formed with the body 22 in such a way to that the body 22 extends up to the curved surface of the lenses.

FIG. 6 is also exemplary of one or more embodiments where (irrespective of whether protruding from the body 22 or not) the lenses 24 may be produced in such a way that their optical axis is at least slightly "leaning" (angle α to the surface of the die 18 less than 90°) such that the optical radiation from the assembly 22, 24 will be at least slightly bent towards the connector C.

The connector C may include an aperture for the collimated beam, and possibly for the lenses of the coupling system of one or more embodiments.

As indicated, one or more embodiments may adopt, e.g., wafer level fabrication processes as used, e.g., in manufacturing camera optics for mobile phone cameras.

The wafer level optics fabrication technologies available with EV Group (EVG) of St. Florian am Inn, Austria may be exemplary of such technologies.

One or more embodiments may provide for a step and repeat process for individually providing single pin stamps on the wafer or the production of a full wafer stamp, this latter option making it possible to produce at a same time all the lenses on a wafer.

Both options may be applicable, e.g., to silicon photonics chips with coupling systems 22, 24 including, e.g., eight (or more) lenses 24, with an electrical chip (e.g., the EIC 20) attached to the optical chip or PIC 18.

Figure 7:
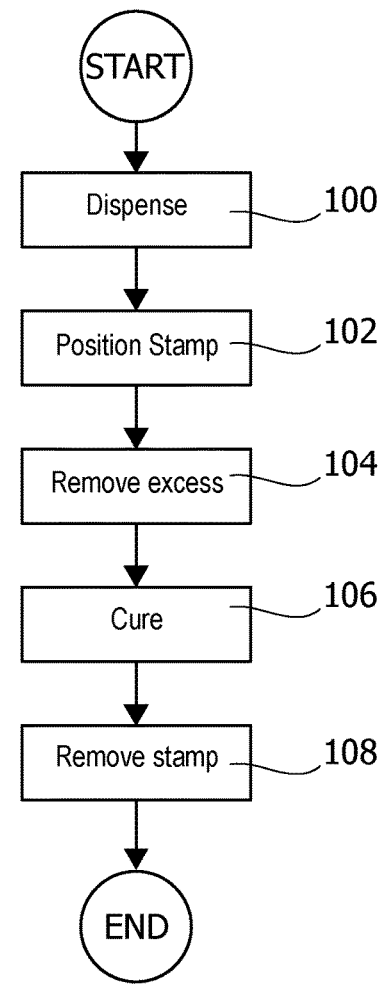
FIG. 7 is a flowchart exemplary of a method according to embodiments.

In one or more embodiments, as exemplified in FIG. 7, in a step 100 a UV curable resin (e.g., a SU8 photoresist) may be dispensed on top of the PIC die 18.

A transparent stamp/mold reproducing in a complementary manner the optical system 22, 24 may be placed on top of the die 18 in a step 102 with excess curable material squeezed out in a step 104.

In a step 106, curing radiation, e.g., UV light may be applied the stamp/mold for curing the resin, with the stamp removed in a step 108.

In a step and repeat process, the sequence discussed above may be repeated until all the chips have lenses 24 attached.

In the case of a full wafer stamp, which makes it possible to produce at a same time all the optical systems 22, 24 on a wafer, the sequence discussed above may be implemented by using a full wafer mold, e.g., including cavities for the EIC's 20 in the plurality of units where the optical systems 22, 24 are provided simultaneously.

For instance, in one or more embodiments, a lens array may be molded onto a 3D assembly at wafer level, with, e.g., a 12" wafer containing around 900 single 3D chips. The wafer may be diced (e.g., singulated using a conventional dicing saw). Die attach to the substrate, wire bonding and dispensing a protective coating on the wirebonding may follow, leading to connector location part attachment and casing/heatsink attachment.

One or more embodiments may thus provide an optical coupling system (e.g., 22, 24) for coupling an optical fiber connector (e.g., C) with a photonics integrated circuit (e.g., PIC 18), wherein the optical coupling system includes a body (e.g., 22) attachable to said photonics integrated circuit (e.g., due to the coupling system being formed directly on the photonics integrated circuit) and an array of lenses (e.g., 24) integrally formed with said body, e.g., with the array of lenses in turn coupleable to the connector (C) for the optical fibers (F).

As noted this is contrary to conventional solutions where the lenses are formed separately from the PIC and then glued onto the PIC with a suitable epoxy, e.g., by means of a high-accuracy pick-and-place assembly machine.

In one or more embodiments, said array of lenses may include a linear array of lenses.

In one or more embodiments, said body and said array of lenses may include polymer material.

In one or more embodiments, said body and said array of lenses may include cured material, optionally optically (e.g., UV) cured material.

One or more embodiments may thus provide a device (e.g., 10) including:
  a photonics integrated circuit (e.g., PIC 18) providing at least one of electro-optical and opto-electrical signal conversion between an electrical side and an optical side of the circuit, and
  an optical coupling system (e.g., 22, 24) according to one or more embodiments coupled with the optical side of said circuit.

In one or more embodiments, said body (and the optical coupling system as a whole) may be formed directly on said photonics integrated circuit (e.g., PIC 18), e.g., without additional materials applied therebetween.

In one or more embodiments, said photonics integrated circuit may include input and/or output gratings at said optical side, with said optical coupling system coupled with the optical side of said circuit at said gratings.

One or more embodiments may include an electrical circuit (e.g., EIC 20) coupled, optionally by (e.g., Cu) pillars, with said electrical side of the photonics integrated circuit.

A method of manufacturing an optical coupling system according to one or more embodiments may include:
  dispensing (e.g., step 100 in FIG. 7) curable material onto said photonics integrated circuit by shaping (e.g., steps 102, 104) said curable material into said body and said array of lenses, and
  curing (e.g., step 106) said material shaped into said body and said array of lenses thus providing said body and said array of lenses integrally formed therewith.

One or more embodiments may include placing onto said curable material dispensed onto said photonics integrated circuit a stamp to shape said curable material into said body and said array of lenses.

One or more embodiments may include removing (104) excess curable material dispensed onto said photonics integrated circuit after placing said stamp.

Without prejudice to the underlying principles, the details and the embodiments may vary, even significantly, with respect to what has been disclosed by way of example only in the foregoing, without departing from the extent of protection.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An optical coupling, comprising:
   a body made of a curable material, the body having:
      a first surface directly cured onto a photonics integrated circuit, the first surface having an area smaller than an area of the photonics integrated circuit; and
      a second surface including an array of lenses integral with the body, wherein the array of lenses is configured to couple to an optical fiber connector.

2. The optical coupling of claim 1 wherein said array of lenses includes a linear array of lenses.

3. The optical coupling of claim 1 wherein said body is a one-piece body comprising polymer material.

4. The optical coupling of claim 1 wherein the body comprises optically cured material.

5. The optical coupling of claim 1 wherein the array of lenses extend away from the second surface of the body.

6. A device, comprising:
   a photonics integrated circuit, which, in operation, converts one or more of:
      at least one electrical signal into an optical signal; and
      at least one optical signal into an electrical signal; and
   an optical coupling including a body made of a curable material, the body having:
      a first surface directly cured onto a portion of a surface of the photonics integrated circuit and optically coupled with the portion of the surface of the photonics integrated circuit; and
      a second surface including an array of lenses integral with the body, wherein the array of lenses is configured to couple to an optical fiber connector.

7. The device of claim 6 wherein said array of lenses includes a linear array of lenses.

8. The device of claim 6 wherein said body comprises polymer material.

9. The device of claim 6 wherein said body is a single piece body of cured material.

10. The device of claim 9 wherein the cured material comprises optically cured material.

11. The device of claim 6 wherein said photonics integrated circuit includes optical gratings and said optical coupling couples with said optical gratings.

12. The device of claim 6, comprising an electrical circuit coupled with the photonics integrated circuit.

13. The device of claim 12, comprising pillars coupling the electrical circuit with the photonics integrated circuit.

14. The device of claim 12 wherein the electrical circuit comprises image processing circuitry.

15. The device of claim 14, wherein the device is a mobile phone.

16. The device of claim 6 wherein the array of lenses extend away from the second surface of the body.

17. A method of manufacturing an optical coupling, comprising:
   shaping curable material on a photonics integrated circuit into a body positioned on a portion of a surface of the photonics integrated circuit; and
   curing the body of curable material onto the photonics integrated circuit, the cured body including:
      a first surface directly in contact with the photonics integrated circuit; and
      a second surface including an array of optical lenses to couple with an optical cable.

18. The method of claim 17, comprising dispensing the curable material on to the photonics integrated circuit.

19. The method of claim 17 wherein said array of lenses includes a linear array of lenses.

20. The method of claim 17 wherein said curable material comprises a polymer.

21. The method of claim 17, comprising optically curing the curable material.

22. The method of claim 17 wherein shaping the curable material into the body comprises stamping a single piece of the curable material.

23. The method of claim 22, comprising removing excess curable material after the stamping.

24. The method of claim 17 wherein said photonics integrated circuit includes optical gratings and said optical coupling couples with said optical gratings.

25. The method of claim 17 wherein the array of optical lenses extend away from the second surface of the cured body.

26. A system, comprising:
   an integrated circuit having a first surface and a second surface, the first surface including a plurality of optical grating couplers; and
   an optical coupling body made of a curable material, the optical coupling body including:
      a base portion having a first and second surface, the first surface of the base portion being directly cured onto the first surface of the integrated circuit and having an area less than an area of the first surface of the integrated circuit, the first surface of the base portion optically coupling with the plurality of optical grating couplers of the integrated circuit; and
      a plurality of optical lenses on the second surface of the base portion.

27. The system of claim 26 wherein the plurality of optical lenses extend away from the second surface of the base portion.

28. The system of claim 26, comprising an optical fiber connector optically coupled to the plurality of optical lenses of the optical coupling body.

29. The system of claim 26 wherein the second surface of the base portion of the optical coupling body is opposite of the first surface of the base portion of the optical coupling body.

30. The method of claim 17 wherein the second surface of the cured body is opposite of the first surface of the cured body.

31. The device of claim 6 wherein the second surface of the body is opposite of the first surface of the body.

32. The optical coupling of claim 1 wherein the second surface of the body is opposite of the first surface of the body.

\* \* \* \* \*